United States Patent
Horwood et al.

(10) Patent No.: US 11,772,776 B2
(45) Date of Patent: Oct. 3, 2023

(54) ARRANGEMENT FOR AVOIDING CLASHING ON A FOLDING WING TIP

(71) Applicant: AIRBUS OPERATIONS LIMITED, Bristol (GB)

(72) Inventors: Jack Horwood, Bristol (GB); Paul Morrell, Bristol (GB); Matt Harding, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 181 days.

(21) Appl. No.: 17/297,827

(22) PCT Filed: May 14, 2020

(86) PCT No.: PCT/EP2020/063533
§ 371 (c)(1),
(2) Date: May 27, 2021

(87) PCT Pub. No.: WO2020/229630
PCT Pub. Date: Nov. 19, 2020

(65) Prior Publication Data
US 2022/0024559 A1 Jan. 27, 2022

(30) Foreign Application Priority Data
May 16, 2019 (GB) ...................... 1906899

(51) Int. Cl.
*B64C 3/56* (2006.01)
*B64C 3/18* (2006.01)

(52) U.S. Cl.
CPC ................ *B64C 3/56* (2013.01); *B64C 3/185* (2013.01); *B64C 3/187* (2013.01)

(58) Field of Classification Search
CPC ........... B64C 3/56; B64C 3/185; B64C 3/187; B64U 20/50; B64U 30/12
See application file for complete search history.

(56) References Cited

U.S. PATENT DOCUMENTS 2,392,506 A * 1/1946 Rossmann ................ B64C 3/56
244/102 R
5,372,336 A 12/1994 Paez
(Continued)

FOREIGN PATENT DOCUMENTS

CN 107972847 5/2018
GB 2567899 5/2019
(Continued)

OTHER PUBLICATIONS

International Search Report and Written Opinion of the ISA for PCT/EP2020/063533, dated Aug. 14, 2020, 18 pages.
(Continued)

*Primary Examiner* — Rodney A Bonnette
(74) *Attorney, Agent, or Firm* — Nixon & Vanderhye P.C.

(57) ABSTRACT

An aircraft wing including a fixed wing and a wing tip device rotatable about a hinge at the tip of the fixed wing is disclosed. The wing further includes a hinged panel at the boundary between the wing tip device and the fixed wing. In the flight configuration the panel is closed such that the panel is substantially flush with the upper surface of the wing, and the hinged panel is located in the path of a moveable element (for example part of an actuation mechanism, such as a curved rack). In the ground configuration the panel is hinged open to a position outside the path of the moveable element such that clashing of the moveable element with the stationary structure at the tip of the fixed wing is avoided.

16 Claims, 5 Drawing Sheets

(56) References Cited

U.S. PATENT DOCUMENTS

| | | | |
|---|---|---|---|
| 5,558,299 A * | 9/1996 | Veile | B64C 3/56 244/3.28 |
| 2013/0292508 A1 | 11/2013 | Fox | |
| 2014/0061371 A1 | 3/2014 | Good et al. | |
| 2014/0117151 A1 | 5/2014 | Fox et al. | |
| 2017/0137110 A1 | 5/2017 | Harding et al. | |

FOREIGN PATENT DOCUMENTS

| | | |
|---|---|---|
| WO | 87/02963 | 5/1987 |
| WO | 2015/150835 | 10/2015 |
| WO | 2019/034432 | 2/2019 |

OTHER PUBLICATIONS

Combined Search and Examination Report for GB1906899.8, dated Oct. 23, 2019, 6 pages.

* cited by examiner

Outboard | Inboard

Outboard ← → Inboard

ARRANGEMENT FOR AVOIDING CLASHING ON A FOLDING WING TIP

CROSS REFERENCE TO RELATED APPLICATIONS

The present application is a National Phase of International Application Number PCT/EP2020/063533 filed May 14, 2020, which designated the U.S. and claims priority benefits from Great Britain Application Number GB 1906899.8 filed May 16, 2019, the entire contents of each of which are hereby incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

When the wing tip device is moved relative to the fixed wing, to reach the ground configuration, it is necessary to avoid clashing between these two structures. In some known arrangements, the interface and/or nature of the rotation of the wing tip device is designed in a manner to avoid clashes. An example of such an arrangement is disclosed in WO 2015/150835. In other arrangements, the wing tip device is rotated about a hinge. Examples of such an arrangement are disclosed in US2017/137110, US2013/292508 and US 2014/061371. WO2019/034432 also discloses an aircraft with a hinged wing tip, together with an actuation unit for actuating the foldable wing tip portion.

With hinged wing tip devices, it can be challenging providing a geometry that avoids clashing of the structures, yet also fulfils other important design criteria. Examples of such other design criteria that may need fulfilling are: providing a suitable wing geometry in the flight configuration (e.g. having an aerodynamically efficient profile); having effective sealing between wing tip device and fixed wing; accommodating actuation mechanisms within the wing; and/or accommodating the physical structure of the hinge.

The present invention seeks to mitigate the above-mentioned problems. Alternatively or additionally, the present invention seeks to provide an improved wing tip device arrangement.

SUMMARY OF THE INVENTION

According to a first aspect of the invention, there is provided an aircraft wing, the aircraft wing comprising a fixed wing and a wing tip device rotatable about a hinge at the tip of the fixed wing. The wing tip device comprises a moveable element that moves along a path, relative to stationary structure at the tip of the fixed wing, when the wing tip device is rotated about a hinge axis of the hinge, between: (i) a flight configuration for use during flight and (ii) a ground configuration for use during ground-based operations, in which ground configuration the wing tip device is moved away from the flight configuration such that the span of the aircraft wing is reduced. The wing further comprises an hinged panel at the boundary between the wing tip device and the fixed wing. The wing is arranged such that: in the flight configuration the panel is closed such that the panel is substantially flush with the upper surface of the wing, and the hinged panel is located in the path of the moveable element; and in the ground configuration the panel is hinged open to a position outside the path of the moveable element such that clashing of the moveable element with the stationary structure at the tip of the fixed wing is avoided.

In the flight configuration the panel is located in the path of the moveable element, but in the ground configuration, the panel may be hinged open to a position outside the path of the moveable element. This may avoid a clash that would otherwise have occurred with stationary structure at the tip of the fixed wing (were the hinged panel to be part of the stationary structure). This may enable folding wing tip arrangements, incorporating such a moveable element, to become feasible.

In some embodiments of the invention, the panel need only be of a size necessary to avoid the clash. For example, the panel may be only marginally larger than the part of the moveable element that occupies the path. Embodiments of the invention may therefore enable relatively a small moveable panel to be used, thereby mitigating the impact of the panel on the airflow over the wing.

The hinged panel may be actuated to the open position. For example the wing may comprise a panel actuator arranged to move the panel to the open position.

In some embodiments of the invention, the panel may be hinged open as a result of the moveable element exerting an opening force against the panel as the wing tip device moves to the ground configuration. Such an arrangement has been found to be especially beneficial as it enables 'passive' opening of the panel as and when the need arises (i.e. when the moveable element has moved to a position in which the panel needs to open to allow continued movement of that moveable element).

In some embodiments of the invention, the hinged panel may be biased towards the open position (for example by a biasing member). Such an arrangement may not only ensure the panel hinges open, but it may also be beneficial in providing an effective seal with the adjacent structure when the wing tip is in the flight configuration.

In some embodiments of the invention, the hinged panel may be biased towards the closed position (for example by a biasing member). Such an arrangement may help to keep the panel in the correct position when aero (suction) loads are present during flight. It may also ensure that the panel follows the wing tip device when moving back from the ground to the flight configurations.

It will be appreciated that the panel is located outside the path of the moveable element as and when it is located in a position that need not be occupied by the moveable element. For example, the panel may be located beyond the end of the path of the moveable element. In other embodiments, the panel may be located to the side, or otherwise away from, the path of the moveable element. During movement of the wing tip device from the flight configuration towards the ground configuration, the panel may move along the path of the moveable element, to an eventual position outside that path.

The wing may comprise an actuation mechanism for moving the wing tip device from the flight configuration to the ground configuration. The actuation mechanism may comprise the moveable element. Providing a panel for accommodating a moveable element that is part of an actuation mechanism for the folding wing tip, has been found especially beneficial because it enables potentially-advantageous actuation mechanisms to be used, whilst avoiding clashing during movement to the ground configuration.

The actuation mechanism may comprise a rotary drive. The rotary drive may be arranged to drive the moveable element in a curved path to move the wing tip device between the flight configuration and the ground configuration. The rotary drive may be arranged with an axis of rotation that is parallel to the hinge axis. The rotary drive mechanism may be arranged with an axis of rotation that is parallel to and coincident with the hinge axis. The rotary drive may comprise a geared rotary actuator (GRA). The rotary drive may comprise a pinion. The moveable element may comprise a rack for being driven by the pinion. The rack may be a curved rack for moving along a curved path. The curved path may be curved around the hinge axis. An actuation unit having some of the above-mentioned features of the actuation mechanism, is disclosed in WO2019/034432.

In embodiments of the invention, the panel is a hinged panel. The panel is rotatable about an panel-hinge axis. The panel may comprise a hinged edge. The panel may comprise a free edge, opposite the hinged edge. The hinged edge is preferably hinged to the fixed wing, and more preferably hinged to an upper cover of the fixed wing.

The panel-hinge axis is preferably substantially parallel to the hinge axis of the wing tip device. Such an arrangement is beneficial in that it tends to ensure straightforward opening of the panel as the wing tip device rotates.

The wing tip device may comprise an upper cover. The upper cover may comprise the wing skin of the wing tip device. The upper cover may define part of the upper surface of the wing tip device. The upper cover may comprise a replaceable element—for example a part of the cover that may be subjected to relatively high wear such as a part of the cover along the interface adjoining the hinged panel—see below.

In the flight configuration the upper cover of the wing tip device may adjoin the hinged panel along an interface. The interface is preferably offset from the hinge axis of the wing tip device. The interface is preferably offset outboard from the hinge axis of the wing tip device. By offsetting the interface outboard of the hinge axis, the interface may be located such that as the wing tip device rotates from the flight configuration to the ground configuration, the upper cover is lifted away from adjacent structure (for example lifted away from the hinged panel).

The hinge axis may extend through the depth of the wing (for example it may pass through the wing box). Such an arrangement tends to be desirable so that at least some of the structure of the hinge is accommodated within the depth of the wing and does not unduly impact on the aerodynamics of the wing. The interface may be vertically offset from the hinge axis.

The interface may be arranged such that an edge of the upper cover overlaps the adjoining edge of the hinged panel along an overlap region. The interface may be outboard of the hinge axis of the wing tip device, such that as the wing tip device rotates from the flight configuration to the ground configuration, the upper cover is lifted away from the hinged panel along the overlap region. Such an arrangement may therefore enable the upper cover to readily separate from the hinged panel.

The above-mentioned arrangement may also be beneficial during return movement of the wing tip device from the ground configuration to the flight configuration. The wing may be configured such that during return movement from the ground configuration to the flight configuration, the upper cover and the hinged panel contact each other along the overlap region. The contact may be such that the upper cover draws the hinged panel back down into the closed position.

The above-mentioned arrangement may be beneficial in that it enables the edge of upper cover to clamp the hinged panel in place once the wing tip device is in the flight configuration. This may reduce the likelihood of deflections of the panel during flight (for example due to relatively low pressure air across the upper cover).

In some embodiments, the hinged panel may be closed under the force of gravity. In some embodiments the hinged panel may be closed under a biasing force, for example a spring force.

The overlap region is preferably along a free edge of the hinged panel. The free edge is preferably opposite the hinged edge of the panel.

The overlap region may comprise a seal for sealing between the hinged panel and the wing tip device. In some embodiments, the hinged panel may be biased open such that in the flight configuration, the hinged panel is urged towards the wing tip device, and preferably towards the upper cover of the wing tip device. Such an arrangement may be beneficial in ensuring an effective seal in the region of overlap and/or in minimising deflection of the panel during flight.

The wing may be arranged such that, in the ground configuration, the wing tip device has rotated about the hinge such that the edge of the upper cover is inboard of the hinged panel. For example, the edge of the upper cover may be inboard of the panel-hinge axis. Such an arrangement has been found to be beneficial because it enables the upper cover to move beyond the hinged panel.

The wing may be arranged such that, in the ground configuration, the wing tip device has rotated about the hinge such that the edge of the upper cover is inboard of the hinge axis. Such an arrangement has been found to be beneficial because it enables the upper cover to rotate beyond the hinge axis of the wing tip, such that the upper panel moves back towards the fixed wing (for example towards the upper surface of the fixed wing). In the ground configuration, the edge of the upper cover of the wing tip device may be rotated beyond the hinge axis such that it at least partially envelopes the hinged panel. In the ground configuration, the upper cover of the wing tip device may be arranged to shield the hinged panel from view. In the ground configuration, the upper cover of the wing tip device may envelope the hinged panel such that the upper cover is arranged to shield the hinged panel from environmental elements.

The tip of the fixed wing may comprise a wing box. The wing box may have a pair of ribs. The wing box may have a pair of spars. The wing box may have an upper and lower cover.

The wing tip device, and preferably the root of the wing tip device, may comprise wing tip box. The wing tip box may comprise a pair of wing tip spars. The wing tip box may comprise a pair of wing tip ribs. The wing tip box may comprise a wing tip upper cover and a wing tip lower cover.

When the wing tip is in the flight configuration, the upper and lower covers of the wing tip box may be continuations of the upper and lower covers of the wing box. The hinged panel may be hinged on the upper cover of the wing box such that the hinged panel is flush with the adjoining upper covers.

Embodiments of the invention may be beneficial where the moveable element, or part of the moveable element is housed in the wing box. The actuation mechanism may be at least partially housed in the wing box of the fixed wing. A rotary drive may be housed in the wing box of the fixed wing. The moveable element, for example a curved rack, may extend out of the wing box of the fixed wing.

According to another aspect of the invention, there is provided an aircraft incorporating the aircraft wing of the first aspect.

According to another aspect of the invention, there is provided a method of moving a wing tip device from a flight configuration for use during flight, to a ground configuration for use during ground-based operations, in which ground configuration the wing tip device is moved away from the flight configuration such that the span of the aircraft wing is reduced. The method comprises the steps of opening a hinged panel from a closed position in which the panel is located in the path of a moveable element of the wing tip device, and is substantially flush with the upper surface of the wing, to an open position in which the panel is located outside the path of the moveable element. The method may comprise the step of actuating the wing tip device from the flight configuration by effecting movement of the moveable element. The method may comprise the step of effecting movement of the moveable element, such that the moveable element exerts an opening force on the panel.

According to another aspect of the invention, there is provided a method of moving a wing tip device from a ground configuration for use during ground-based operations, to a flight configuration for use during flight in which flight configuration the wing tip device is moved away from the ground configuration such that the span of the aircraft wing is increased. The method may comprise the steps of closing a hinged panel from an open position, to a closed position in which the panel is substantially flush with the upper surface of the wing, the closing of the panel being effected by the wing tip device and the hinged panel contacting each other along an overlap region, such that the wing tip device draws the hinged panel back down into the closed position during movement from the ground configuration to the flight configuration.

According to yet another aspect of the invention, there is provided a folding wing tip arrangement for an aircraft wing, the arrangement comprising a fixed wing and a rotatable wing tip device at the tip thereof, the wing tip device being configurable by a wing tip actuator between: (i) a flight configuration for use during flight and (ii) a ground configuration for use during ground-based operations, in which ground configuration the wing tip device is moved away from the flight configuration such that the span of the aircraft wing is reduced. The arrangement comprises a moveable panel at the interface between the wing tip device and the fixed wing. The panel is moveable to an open position to accommodate movement of the wing tip actuator as the wing tip actuator moves the wing tip device to the ground configuration. In the flight configuration the moveable panel may be closed and may occupy a space that would be occupied by the actuator when the wing tip device is in the ground configuration. In the ground configuration the moveable panel may be open to allow the actuator to occupy that space. The wing tip device may be hinged for movement between the flight and ground configurations. The moveable panel may be hinged.

In embodiments of the present invention, the wing tip device is configurable between: (a) a flight configuration for use during flight and (b) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises at least 70%, 80%, 90%, or more, of the overall span of the aircraft wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not movable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

In the ground configuration the wing tip device may be held in place. For example the wing tip device may be latched or locked in place to prevent movement back towards the flight configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 1b shows a schematic view of an aircraft incorporating wings according to FIG. 1a;

FIG. 2b is a section view through A-A in FIG. 2a;

DETAILED DESCRIPTION

Figure 1A:
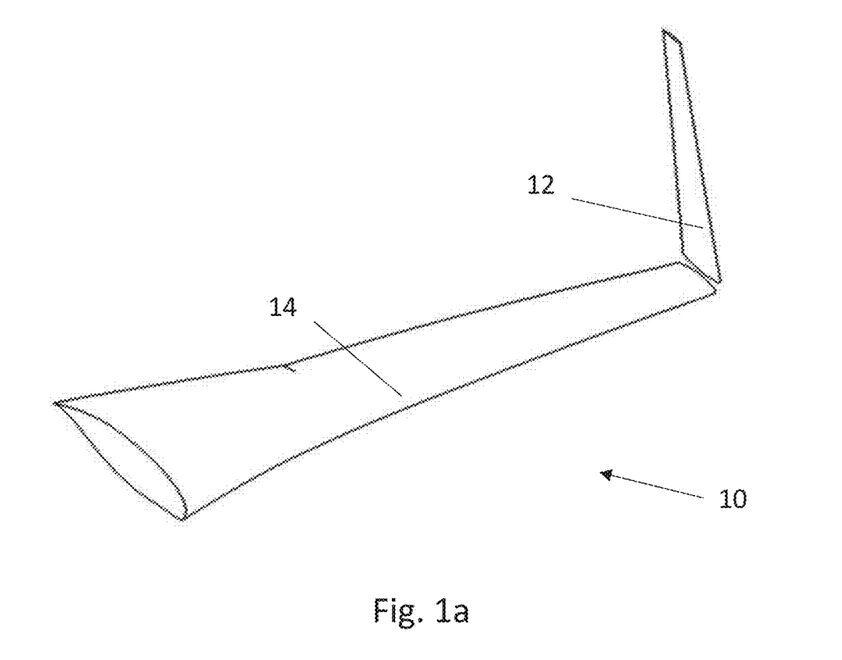
FIG. 1a shows a schematic view of an aircraft wing according to a first embodiment of the invention.
Figure 1B:
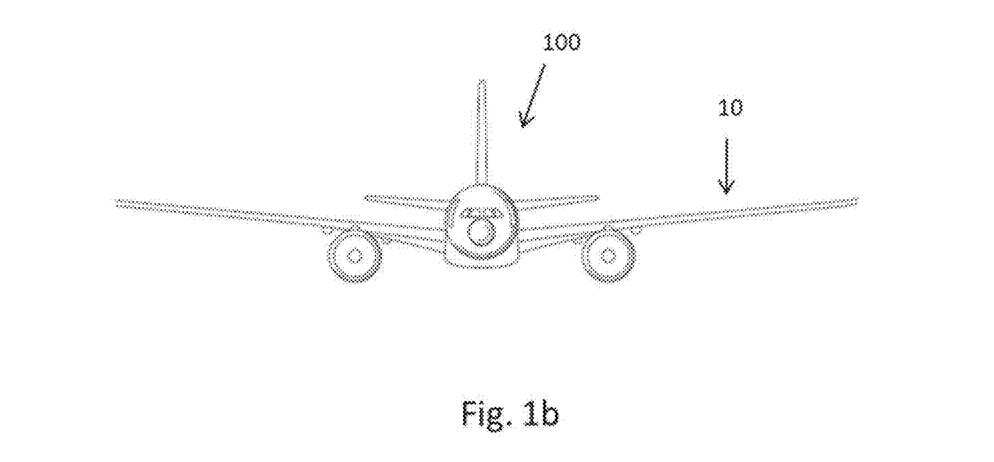

FIG. 1a shows a wing 10 comprising a wing tip device 12 and a fixed wing 14. The wing tip device 12 is configurable between: (i) a flight configuration for use during flight, as shown in FIG. 1b and (ii) a ground configuration for use during ground-based operations, as shown in FIG. 1a, in which ground configuration the wing tip device 12 is moved away from the flight configuration such that the span of the aircraft wing 10 is reduced.

FIGS. 2a to 4b show part of the wing 10 in the first embodiment of the invention, and reference will now be made to these Figures.

Figure 2A:
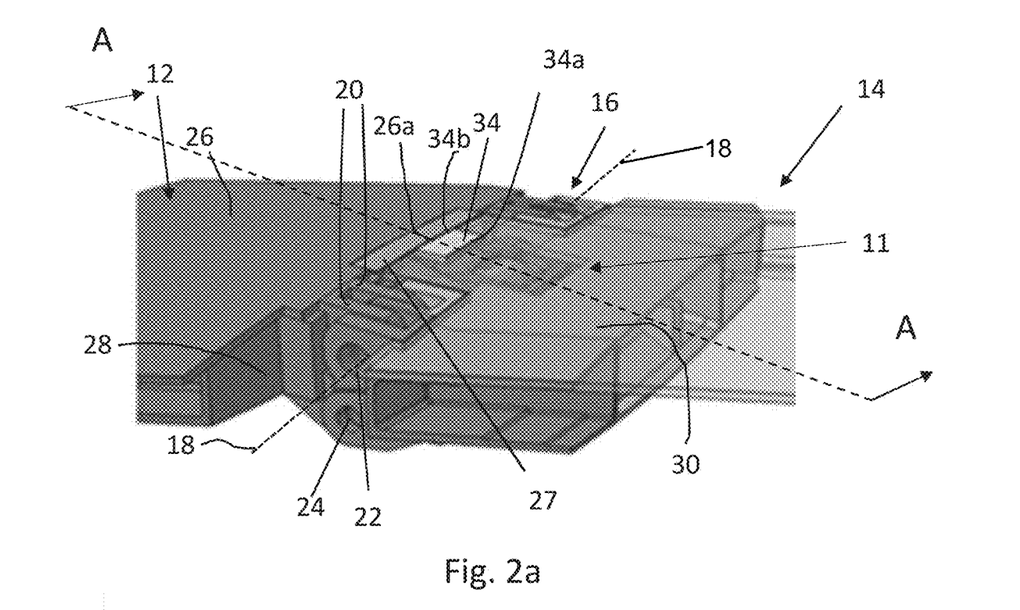
FIG. 2a shows a close-up view of the hinge and the surrounding parts of the wing tip device and fixed wing of FIG. 1a, with some of the other surrounding structure removed for the sake of clarity.
Figure 3:
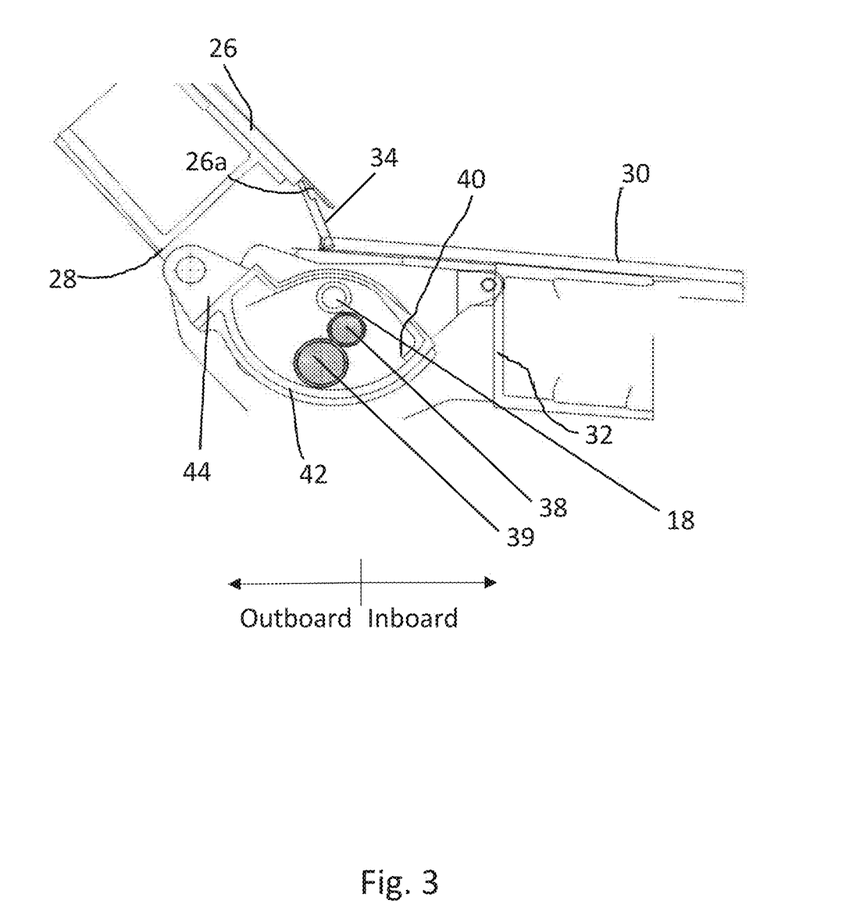
FIG. 3 shows the corresponding features of the wing in FIG. 2b but with the wing tip partially moved from the flight configuration towards the ground configuration.
Figure 4A:
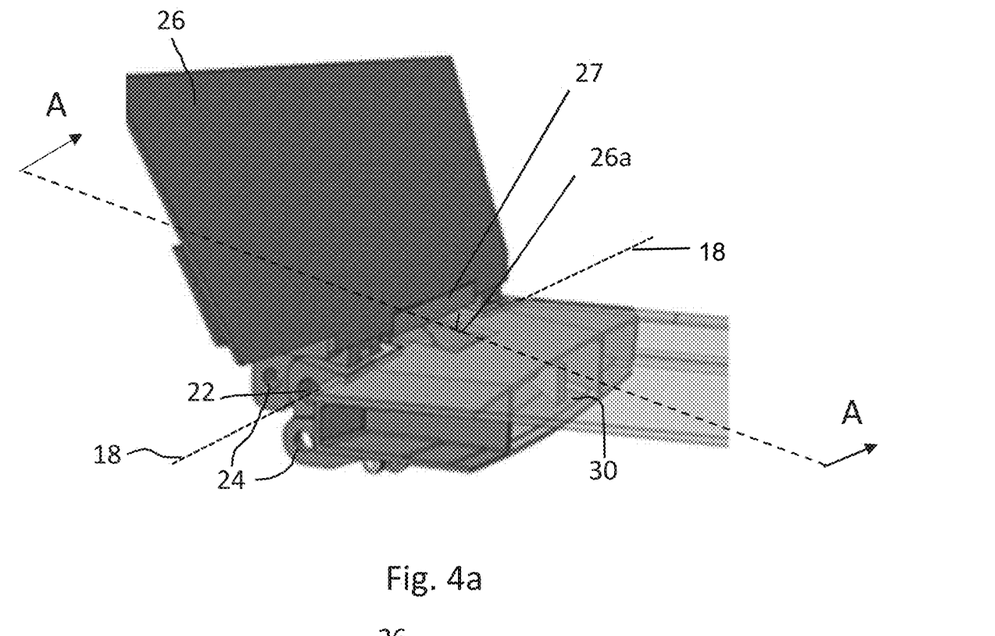
FIGS. 4a and 4b show the corresponding features of the wing in FIGS. 2a and 2b but with the wing tip device in the ground configuration.

FIGS. 2a and 4a show close-up views of the hinge and of the surrounding parts of the wing tip device and fixed wing. The leading and trailing edge structures have been removed for the sake of clarity. It will be appreciated that these leading and trailing edge structures extend fore and aft of the parts of the wing shown in FIGS. 2a-4a.

Referring first to FIG. 2a, the wing 10 comprises the wing tip device 12 and the fixed wing 14. The wing tip device 12 is hinged to the fixed wing about a hinge 16 having a hinge axis 18. The hinge 16 comprises a series of interleaving lugs 20 on the root of the wing tip device 12 and the tip of the fixed wing. The lugs 20 have apertures 22 through which a hinge pin (not shown) extends (the hinge pin being coaxial with the hinge axis 18). The interleaving lugs 20 are provided in pairs, with a space between for accommodating an actuator mechanism (described in more detail below).

The interleaving lugs 20 also comprise a series of lower apertures 24 for receiving locking pins (not shown) to hold the wing tip in the flight configuration. The exact nature of the locking arrangement for holding the wing tip device in the flight configuration is not relevant to the present invention and is not described in detail herein.

The wing tip device 12 comprises an upper cover 26 connected to a wing tip root rib 28. The upper cover 26 forms the outer skin on the upper surface of the wing tip device 12.

The fixed wing 14 comprises an upper cover 30 connected to a tip rib 32. The upper cover 30 forms the outer skin on the upper surface of the fixed wing 14.

The upper cover 26 of the wing tip device meets the upper cover 30 of the wing along an interface. The upper cover 30 of the fixed wing comprises a rectangular cut-out in which a hinged panel 34 is located. The hinged panel 34 comprises a hinged edge 34a and a free edge 34b opposite the hinged edge 34a.

In the flight configuration, the hinged panel 34 is closed and the panel is substantially flush with the surrounding upper surfaces of the covers 26, 30.

The cover 26 of the wing tip 12 comprises a replaceable rectangular panel 27. An edge 26a of the panel 27 (part of the cover 26 of the wing tip device overlaps the free edge 34b of the hinged panel wing tip in an overlap region 36 (shown circled in FIG. 2b).

The lugs 20 are not covered by the covers 26, 30 and are instead covered by a lug-seal (not shown).

The wing 10 comprises an actuation mechanism 11 comprising a geared rotary actuator GRA (not fully visible in the Figures) and a curved rack 40. The curved rack 40 comprises a series of teeth spaced along the curved surface, but these are not illustrated in the Figures. The GRA has an output shaft onto which a pinion gear 38 is mounted. The pinion gear 38 is coupled, via a secondary gear 39, to mesh with the teeth of the curved rack 40. The curved rack 40 includes a support structure 42 which is fixedly attached to a root of the wing tip device 12 via a pair of lugs 44 (only one of which is visible in FIG. 2b).

The GRA is arranged to drive the rack 40 in a curved path to move the wing tip device 12 between the flight configuration (FIG. 2a/2b) and the ground configuration (FIG. 4a/4b). That movement will now be described with reference to FIGS. 3 and 4a to 4b.

FIG. 3 show the wing tip partially moved from the flight configuration towards the ground configuration. The GRA has rotated the pinion 38 such that the rack is rotated outboard, thereby moving the wing tip device 12 such that it rotates about the hinge axis 18.

The upper cover 26 of the wing tip device moves as part of the wing tip device. The hinged panel 34 is not connected to the wing tip device and in principle would remain closed once the upper panel is moved away under rotation of the wing tip device.

However, in the first embodiment of the invention, the hinged panel 34 is biased by a spring (not visible) urging the panel 34 towards an open position. In this manner, the hinged panel 34 initially follows movement of the upper cover 26 and opens to the position shown in FIG. 3.

In the intermediate position of the wing tip device shown in FIG. 3, the wing tip device 12 is only partially rotated and the supporting structure 42 of the rack is still located below the level of the upper covers (i.e. within the wing envelope). However, to reach the ground configuration (to reduce the span of the aircraft to within a gate limit), continued rotation of the pinion 38 is required, thereby moving the rack 40 further along its curved path.

Figure 4B:
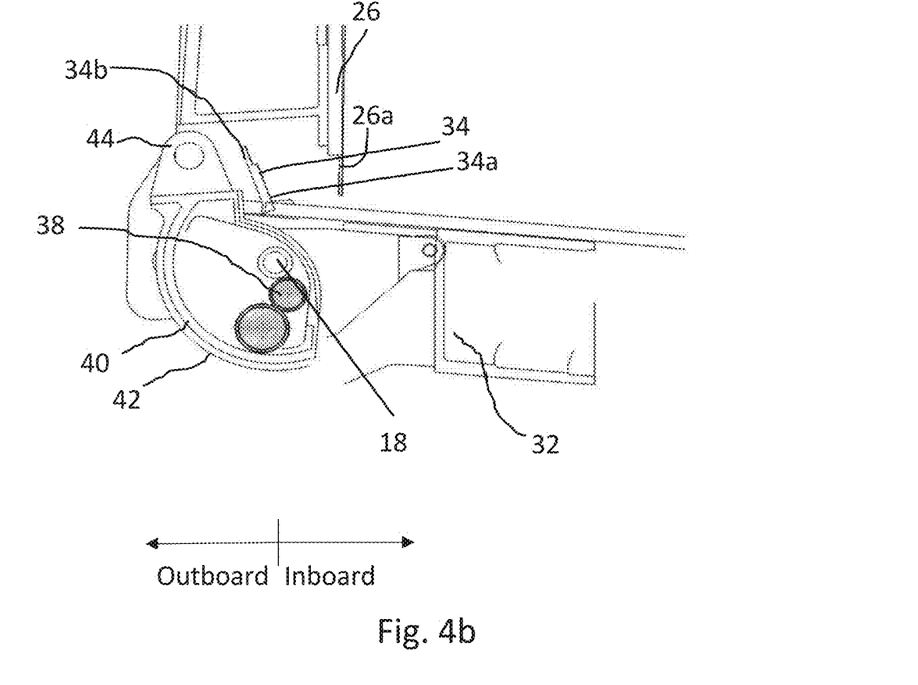

FIGS. 4a and 4b show the wing tip device 12 in the ground configuration, and reference will now be made to these Figures. In the ground configuration, the rack 40 has been moved sufficiently far that it protrudes above the envelope of the wing, and more specifically it occupies the space that the hinged panel 34 occupied when the wing tip device 12 was in the flight configuration (see FIG. 2b). To accommodate the movement of the rack 40, the hinged panel 34 has been moved to its open position in which it is no longer in the path of the rack 40. Such an arrangement enables the GRA/rack actuation mechanism 11 to be used on a hinged wing tip device because it prevents the rack 40 clashing with the covers 30 of the fixed wing.

The relative locations of the panel-hinge 34a, the wing tip device hinge 16, 18, and the edge 26a of the upper cover 26 of the wing tip device 12 are especially advantageous: In the flight configuration, the edge 26a of the upper cover 26 (which adjoins the hinged panel 34 in the flight configuration) is outboard of the hinge axis 18. The edge 26a of the upper cover 26 is also outboard of the panel-hinge 34a. Under rotation to the ground configuration the edge 26a of the upper cover 26 is rotated past the panel hinge 34a and past the hinge axis 18 to move inboard of both these hinges. Once the edge 26a is inboard of the hinge axis 18, further rotation causes the edge 26a to move downwardly towards the cover 30 of the fixed wing 14.

Such an arrangement is advantageous in that it enables the wing tip device 12 to move to a position in the ground configuration in which the upper cover 26 envelopes the hinged panel 34 and shields the panel 34 from sight and from the surrounding environment. This may be beneficial aesthetically and functionally in that it reduces exposure of the hinged panel and the actuation mechanism 11 to the surrounding environment.

Figure 2B:
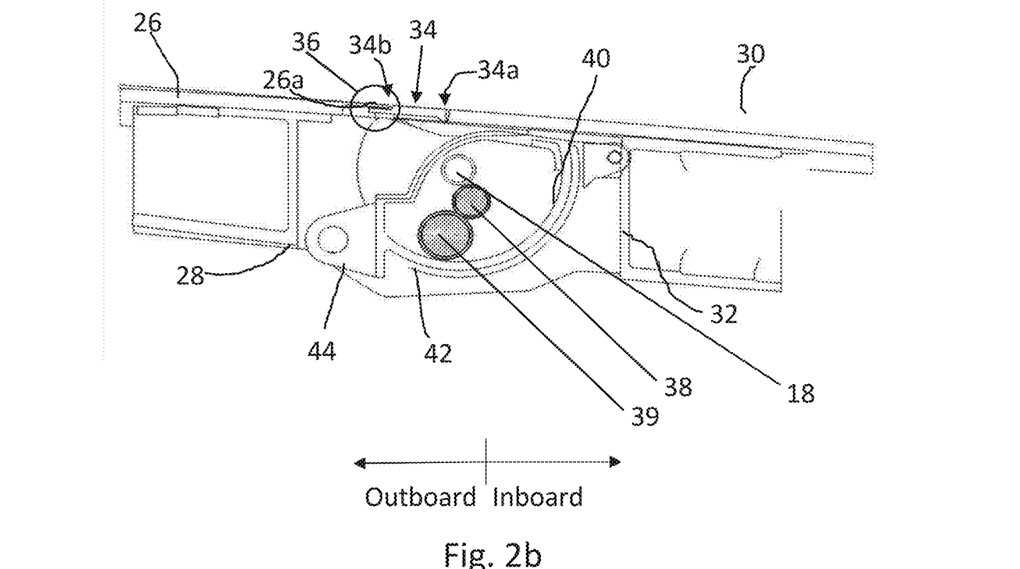

In the first embodiment of the invention the hinge axis 18 is aligned in the line of flight direction. The sectional views shown in FIGS. 2b, 3 and 4b are along section A-A which runs perpendicular to this line of flight direction.

The embodiment in FIGS. 2a to 4b also provides advantages during return of the wing tip device 12 from the ground configuration to the flight configuration: The return movement of the wing tip device 12 to the flight configuration is effected by the reverse rotation of the pinion 38, and hence the reverse movement of the rack 40 along its curved path. At the stage shown in FIG. 3, the edge 26a of the upper cover 26 contacts the free edge 34b of the hinged panel 34 along the region of overlap. Continued movement of the rack 40 pulls the wing tip device 12 into the flight configuration, thereby drawing the hinged panel 34 closed.

Figure 5:
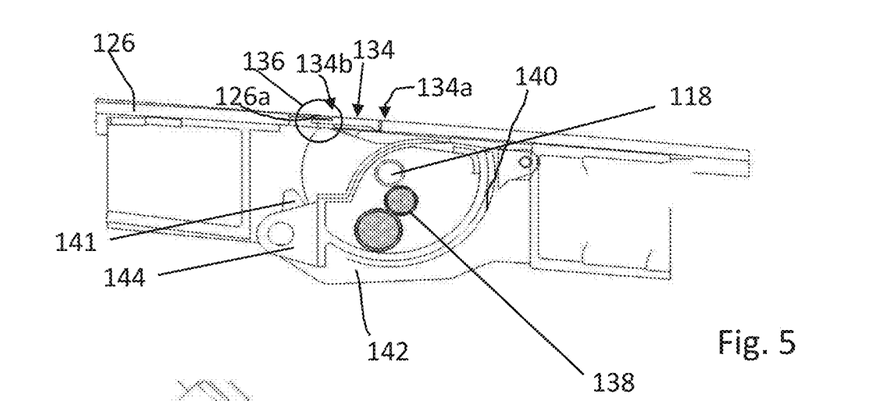
FIGS. 5 to 7 show a wing according to a third embodiment of the invention.
Figure 6:
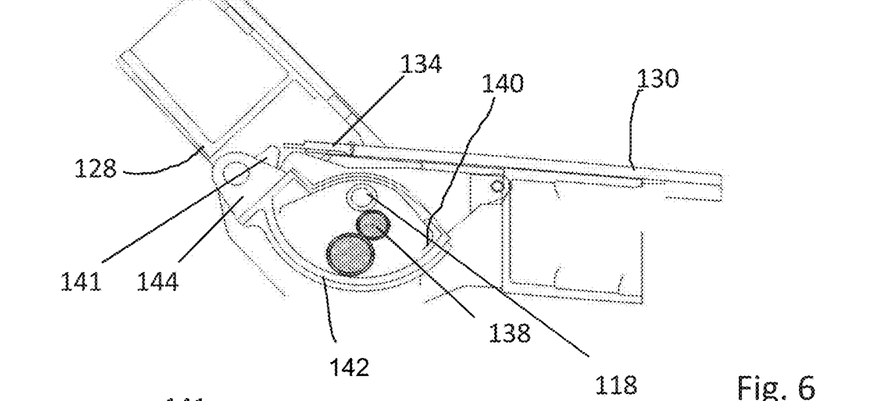
Figure 7:
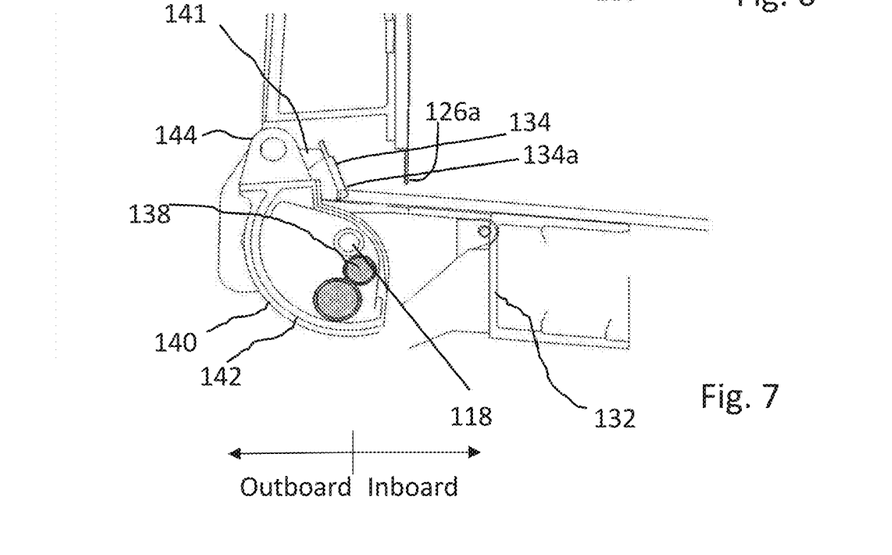

By virtue of the biasing force urging the panel 34 open, a seal (not shown) is compressed along the overlap region, thereby sealing the joint in the region of overlap between the cover 26 and the hinged panel 34. The seal may be subject to wear during use, so the panel 37 of the cover 26 encompassing the edge 26a is replaceable A further embodiment is shown in FIGS. 5, 6 and 7. These are sectional images corresponding to those in FIGS. 2b, 3 and 4b but for the second embodiment of the invention. Like features that are common to the first embodiment are shown using the same reference numerals but incremented by 100. This arrangement in the second embodiment is substantially similar to the previous embodiment, except that the hinged panel 134 is spring loaded in the opposition direction (i.e. biased towards the closed position). To open the panel 134, the opening force is provided by virtue of a protrusion 141 on the rack structure 140 pushing the panel 134 open as the rack 140 moves along its path to a position occupied by the panel 134. Continued movement of the rack 140 pushes the panel 134 open and out of the path (i.e. beyond the path) of the rack 140. During return movement to the flight configuration, the panel 134 is closed under the action of the return spring once it is no longer being urged open by the rack structure. When the wing tip device 112 is in the flight configuration, the upper cover 126 overlaps the free end of the hinged panel. The panel 134 is held in place by the joint action of the spring force and the overlap 136 by the upper cover 126, which may be beneficial in holding the panel 134 firmly in place under the relatively low pressure airflow over the upper surface of the wing during flight.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing, the aircraft wing comprising a fixed wing and a wing tip device rotatable about a hinge at the tip of the fixed wing,
   wherein the wing tip device comprises a moveable element that moves along a path, relative to a stationary structure at the tip of the fixed wing, when the wing tip device is rotated about a hinge axis of the hinge, between:
   (i) a flight configuration for use during flight and (ii) a ground configuration for use during ground-based operations, in which ground configuration the wing tip device is moved away from the flight configuration such that the span of the aircraft wing is reduced, wherein the wing further comprises a hinged panel at the boundary between the wing tip device and the fixed wing, and the wing is arranged such that:
   in the flight configuration the hinged panel is closed such that the hinged panel is flush with the upper surface of the wing, and the hinged panel is located in the path of the moveable element,
   and in the ground configuration the hinged panel is hinged open to a position outside the path of the moveable element such that clashing of the moveable element with the stationary structure at the tip of the fixed wing is avoided,
   wherein the hinged panel is hinged open as a result of the moveable element exerting an opening force against the hinged panel as the wing tip device moves to the ground configuration, and
   wherein the wing further comprises an actuation mechanism for moving the wing tip device from the flight configuration to the ground configuration, and the actuation mechanism comprises the moveable element.

2. A wing according to claim 1, wherein the actuation mechanism comprises a rotary drive, the rotary drive being arranged to drive the moveable element in a curved path to move the wing tip device between the flight configuration and the ground configuration.

3. A wing according to claim 2, wherein the rotary drive comprises a pinion, and the moveable element comprises a curved rack for being driven along a curved path by rotation of the pinion.

4. A wing according to claim 1, wherein the hinged panel is rotatable about a panel-hinge axis that is parallel to the hinge axis of the wing tip device.

5. A wing according to claim 1, wherein the wing tip device comprises an upper cover and in the flight configuration the upper cover of the wing tip device adjoins the hinged panel along an interface, the interface being arranged such that an edge of the upper cover overlaps the adjoining edge of the hinged panel along an overlap region.

6. A wing according to claim 5, wherein the interface is outboard of the hinge axis of the wing tip device, such that as the wing tip device rotates from the flight configuration to the ground configuration, the upper cover is lifted away from the hinged panel along the overlap region.

7. A wing according to claim 6, wherein the wing is configured such that during return movement from the ground configuration to the flight configuration, the upper cover and the hinged panel contact each other along the overlap region, such that the upper cover draws the hinged panel back down into the closed position.

8. A wing according to claim 5, wherein in the ground configuration, the wing tip device is rotated about the hinge such that the edge of the upper cover is inboard of the hinged panel.

9. A wing according to claim 8, wherein in the ground configuration, the wing tip device is rotated about the hinge such that the edge of the upper cover is inboard of the hinge axis, thereby at least partially enveloping the hinged panel.

10. A wing according to claim 1, wherein the tip of the fixed wing comprises a wing box having a pair of ribs, a pair of spars and an upper and lower cover, and wherein the root of the wing tip device comprises wing tip box, comprising a pair of wing tip spars, a pair of wing tip ribs and a wing tip upper cover and a wing tip lower cover, and wherein when the wing tip is in the flight configuration, the upper and lower covers of the wing tip box are continuations of the upper and lower covers of the wing box, and the hinged panel is hinged on the upper cover of the wing box such that the hinged panel is flush with the adjoining upper covers.

11. A wing according to claim 10, wherein the rotary drive is housed in the wing box of the fixed wing.

12. A method of moving a wing tip device from a flight configuration for use during flight, to a ground configuration for use during ground-based operations, in which ground configuration the wing tip device is moved away from the flight configuration such that the span of the aircraft wing is reduced, the method comprising the steps of opening a hinged panel from a closed position in which the hinged panel is located in the path of a moveable element of the wing tip device, and is flush with the upper surface of the wing, to an open position in which the hinged panel is located outside the path of the moveable element wherein the hinged panel is hinged open as a result of the moveable element exerting an opening force against the hinged panel as the wing tip device moves to the ground configuration, and wherein the wing further comprises an actuation mechanism for moving the wing tip device from the flight configuration to the ground configuration, and the actuation mechanism comprises the moveable element.

13. A method of moving a wing tip device from a ground configuration for use during ground-based operations, to a flight configuration for use during flight in which flight configuration the wing tip device is moved away from the ground configuration such that the span of the aircraft wing is increased, the method comprising the steps of closing a hinged panel from an open position, to a closed position in which the hinged panel is flush with the upper surface of the wing, the closing of the hinged panel being effected by the wing tip device and the hinged panel contacting each other along an overlap region, such that the wing tip device draws the hinged panel back down into the closed position during movement from the ground configuration to the flight configuration.

14. A folding wing tip arrangement for an aircraft wing, the arrangement comprising a fixed wing and a rotatable wing tip device at the tip thereof, the wing tip device being configurable by a wing tip actuator between:

(i) a flight configuration for use during flight and (ii) a ground configuration for use during ground-based operations, in which ground configuration the wing tip device is moved away from the flight configuration such that the span of the aircraft wing is reduced, wherein the arrangement comprises a moveable panel at the interface between the wing tip device and the fixed wing, and wherein the moveable panel is moveable to an open position to accommodate movement of the wing tip actuator as the wing tip actuator moves the wing tip device to the ground configuration, wherein the moveable panel is located in the path of a moveable element of the wing tip device, wherein the movable panel is hinged open as a result of the moveable element exerting an opening force against the movable panel as the wing tip device moves to the ground configuration, and wherein the wing further comprises an actuation mechanism for moving the wing tip device from the flight configuration to the ground configuration, and the actuation mechanism comprises the movable element.

15. An arrangement according to claim 14, wherein in the flight configuration the moveable panel is closed and occupies a space that would be occupied by the actuator when the wing tip device is in the ground configuration.

16. An arrangement according to claim 15, wherein in the ground configuration the moveable panel is open to allow the actuator to occupy that space.

* * * * *